United States Patent [19]

Gallant

[11] Patent Number: 4,739,907

[45] Date of Patent: Apr. 26, 1988

[54] DEVELOPER STORAGE AND DISPENSER APPARATUS

[75] Inventor: Joseph A. Gallant, Wolcott, N.Y.

[73] Assignee: Xerox Corporation, Stamford, Conn.

[21] Appl. No.: 42,506

[22] Filed: Apr. 27, 1987

[51] Int. Cl.$^4$ .............................................. G01F 11/20

[52] U.S. Cl. .................................... 222/240; 222/241; 222/325; 222/413; 222/410; 222/DIG. 1; 366/157; 366/186; 366/133

[58] Field of Search ............... 222/325, 342, 410, 412, 222/413, 414, 239, 240, 241, 228, 229; 366/157, 156, 186, 133; 198/669, 663, 662

[56] References Cited

U.S. PATENT DOCUMENTS

| | | | |
|---|---|---|---|
| 1,724,805 | 8/1929 | Root . | |
| 2,509,543 | 5/1950 | Truax | 259/6 |
| 2,571,300 | 10/1951 | Simpson | 259/136 |
| 2,858,765 | 1/1975 | Landers | 222/413 |
| 3,724,725 | 4/1973 | Stauffer | 222/DIG. 1 X |
| 3,853,246 | 12/1974 | Dubois | 222/DIG. 1 X |
| 4,297,021 | 10/1981 | Tani et al. | 222/413 X |
| 4,496,086 | 1/1985 | Duchadeau | 222/412 |

FOREIGN PATENT DOCUMENTS 1370715 10/1974 United Kingdom .

*Primary Examiner*—Joseph J. Rolla
*Assistant Examiner*—David H. Bollinger

[57] ABSTRACT

A cylindrical developer storage and dispensing cartridge with a dispensing opening at one end has an integral developer transport mixing and antibridging member rotatably supported within the container which has a first coiled spring element having a cross section substantially the same as the cross section of the container and freely rotatable therein which is wound in the direction to transport developer along its length toward the dispensing opening and a second coiled spring element having a cross section substantially smaller than the first spring element but being substantially concentrically positioned and being attached to the first element but wound in a direction opposite to the first spring element to provide a counter rotating motion relative to the first spring element. The second spring element extends through the central portion of the first spring element and has longitudinal arms at each end attached to at least one of the coils at each end of the first spring element to provide support to the first spring element against compression.

12 Claims, 4 Drawing Sheets

DEVELOPER STORAGE AND DISPENSER APPARATUS

BACKGROUND OF THE INVENTION

The present invention relates to developer storage and dispensing apparatus. More specifically, the present invention is directed to developer dispensing apparatus for a developer station in an automatic electrostatographic printing machine.

Generally, in the process of electrostatographic printing, a photoconductive insulating member is charged to a substantially uniform potential to sensitize the surface thereof. The charged portion of the photoconductive insulating layer is thereafter exposed to a light image of an original document to reproduced. This records an electrostatic latent image on the photoconductive member corresponding to the information areas contained within the original document. Alternatively, in a printing application, the electrostatic latent image may be created electronically by exposure of the charged photoconductive layer by an electronically controlled laser beam. After recording the electrostatic latent image on the photoconductive member, the latent image is developed by bringing a developer material charged of opposite polarity into contact therewith. In such processes the developer material may comrprise a mixture of carrier particles and toner particles or toner particles alone. Toner particles are attracted to the electrostatic latent image to form a toner powder image which is subsequently transferred to copy sheet and thereafter permanently affixed to copy sheet by fusing.

In such automatic printing machines, the toner material is consumed in a development process and must be periodically replaced within the development system in order to sustain continuous operation of the machine. Various techniques have been used in the past to replenish the toner supply. Initially, new toner material was added directly from supply bottles or containers by pouring to the dispensing apparatus fixed in the body of the automatic reproducing machine. The addition of such gross amounts of toner material altered the triboelectric relationship between the toner and the carrier in the developer resulting in reduced charging efficiency of the individual toner particles and accordingly a reduction of the development efficiency when developing the electrostatographic latent image on the image bearing surface. In addition, the pouring process was both wasteful and dirty in that some of the toner particles became airborne and would tend to migrate into the surrounding area and other parts of the machine. Accordingly, separate toner or developer hoppers with a dispensing mechanism for adding the toner from the hopper to the developer apparatus in the automatic printing machines on a regular or as needed basis have been provided. In addition, it has become common practice to provide replenishing toner supplies in a sealed container which when placed in the automatic printing machine can be automatically opened to dispense toner. In such systems as necessary the developer may be dispensed from the container relatively uniformly. Further difficulty may arise in uniformly dispensing the developer in that with a large mass of toner particles, which frequently are somewhat tacky, the particles may tend to agglomerate, become compacted and form a bridging structure in the toner container. In addition, with the use of removable or replaceable developer cartridges and due to the relative high cost of the developer contained therein, it is desirable to remove as much of the developer as possible during the dispensing operation from the cartridge so that only a minimal quantity of developer is not consumed in the dispensing operation and subsequently utilized in the formation of images. Excessive quantities of developer undispensed and remaining in a empty developer cartridge will increase the cost per copy to the consumer.

Various devices have been used to overcome the above-noted problems. For example, in the Xerox 1025 and 1038, the toner hopper is provided with a coiled spring auger which moves the toner material from one end of the hopper to the other. In the Xerox 1060, a similar wire or spring auger is provided in a toner bottle which is replaceable within the machine. In the systems, the augers are driven about one end and unsupported at the other end. Difficulties may be experienced in moving the maximum amount of toner from the bottle when the auger is trying to drive the toner away from the end of the auger which it is driven to the other end of the supply bottle to a dispensing opening resulting in excessive amounts of toner remaining in the bottle. Alternatively, if the auger is rotated in such a fashion as to transport the toner toward the drive end of the auger substantial quantities of toner can remain in the opposite end of the bottle because of the relatively low toner moving capacity of the unsupported end of the auger. In addition, in such a system in which a toner bottle has an auger to transport toner therein which is driven and supported about one end and intended to dispesne toner through a dispensing opening at the other end, as the auger is rotatbly driven tending to drive toner toward the dispensing end the amount of toner at the dispensing increases and tends to become compacted forming a bridge which tends to provide a force on the spring auger compressing it in a direction toward the driven end. If this force becomes to great, it may force the auger spring end past the dispensing opening in the toner cartridge thereby removing the antibridging function of the auger at the dispensing opening and resulting bridging over the dispensing opening and a lack of flow of toner out of the toner cartridge. This is a result of the auger being compressed toward its driven end so that the amount of opening in the dispensing opening is reduced resulting in smaller quantities of toner being dispensed on a continuing basis.

PRIOR ART

Another technique for dispensing toner is that illustrated in British Patent No. 1,370,715 to Stauffer wherein two counter-rotating augers are mounted to a cylindrical drum which is driven to transport toner supplied from a large toner hopper which falls by gravity into the drive means through perforations in an output member. The outer helical spring is in compression between the cylindrical drum portion and the output member and transports toner toward the perforations in the output member. The second helical spring member which has a smaller diameter and is mounted concentrically within the outer spring member has a counter rotating action which prevents caking or compacting of the toner near the output member and is used to transport contaminating materials that do not pass through perforations of the output member into separate collecting container. The second helical spring is unsupported at its other end which prevents caking of toner during the feeding operation due to the flexibility of spring member.

SUMMARY OF THE INVENTION

In accordance with the present invention, a simple, inexpensive and efficient developer storage and dispensing apparatus which uniformly dispenses toner without bridging is provided. More specifically, the developer storage and dispensing apparatus comprises and elongated container enclosed at both ends having a substantially circular cross section with a dispensing opening adjacent one end and containing an integral developer transport mixing and antibridging member rotatably supported at the opposite end of the container and unsupported at said one end which comprises a first coiled spring element having a cross section substantially the same as the cross section of said container and freely rotatable therein. The first spring element is wound in the first direction to transport developer along its length toward the dispensing opening. The developer transport mixing and antibridging member includes a second coiled spring element having a cross section substantially smaller than the first spring element and being substantially concentrically positioned within and attached to the first spring element. The second spring element is wound in a direction opposite to the first spring element to provide a counter rotating motion relative thereto the transport developer along its length away from the dispensing opening toward the opposite end of the container. The second spring element extends through the central portion of the first spring element and has longitudinal arms at each thereof attached to at least one of the coils at each end of the first spring element to provide support to the first spring element against compression.

In a further aspect of the present invention, the first and second spring elements are helically wound springs.

In a further aspect of the present invention, one end of the second spring element terminates adjacent the side of the dispensing slot nearest the opposite end of the container and the other end of the second spring element terminates before the end of the first spring element at the opposite end of the container.

In a further aspect of the present invention, the longitudinal arms at each end of the second spring element are attached to at least two coils of each of the spring element.

In a further aspect of the present invention, the last coil of the unsupported end fo the first spring element is unattached to a longitudinal arm of the second spring element.

In a further aspect of the present invention, the transport mixing and antibridging member is rotatably supported by a drive coupling member on the opposite end of the container which is in driving engagement with one end of the first spring element.

For a better understanding of the invention as well as other objects and further features thereof, reference is had to the following drawings and description:

BRIEF DESCRIPTION OF THE PREFERRED EMBODIMENT

The invention will now be described by reference to a preferred embodiment.

Figure 1:
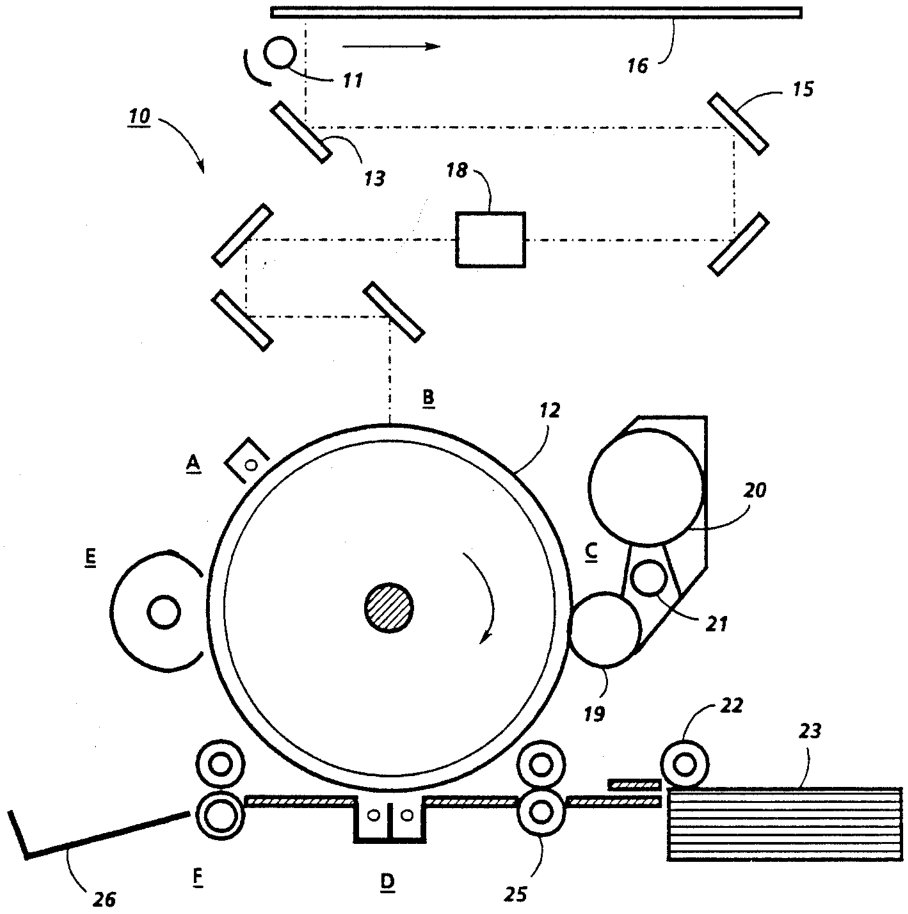
FIG. 1 is schematic representation of an automatic printing machine which may use the replaceable developer stroage and dispensing apparatus according to the present invention.
Figure 2:
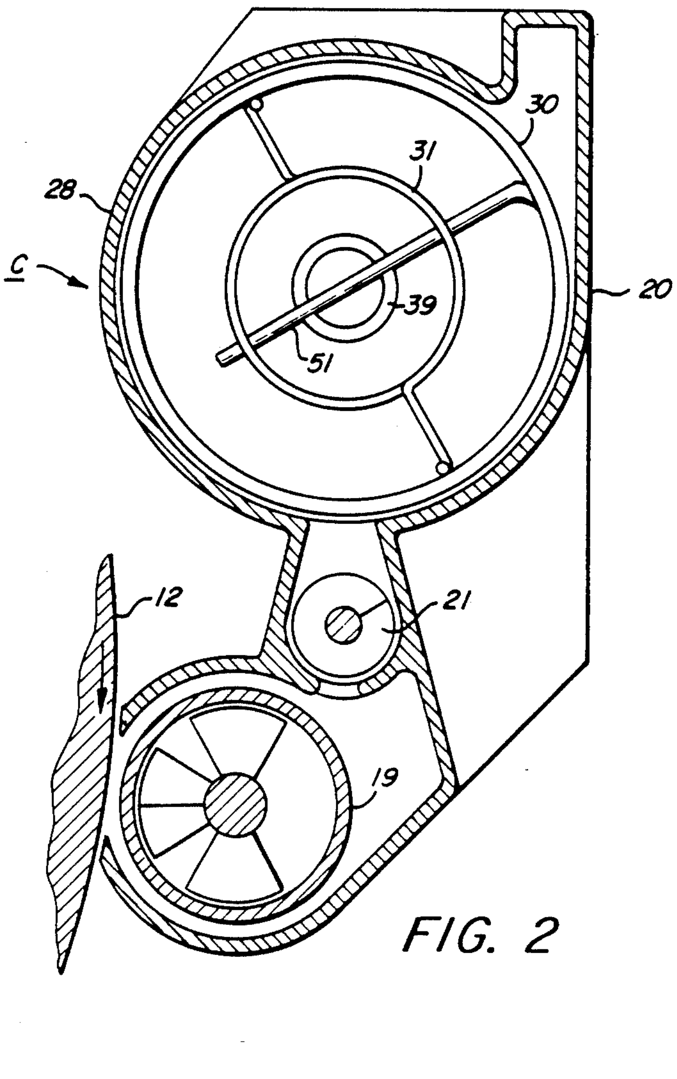
FIG. 2 is a schematic cross-sectional view of the developer unit indicated in FIG. 1 containing the replaceable developer storage and dispensing cartridge according to the present invention.
Figure 3:
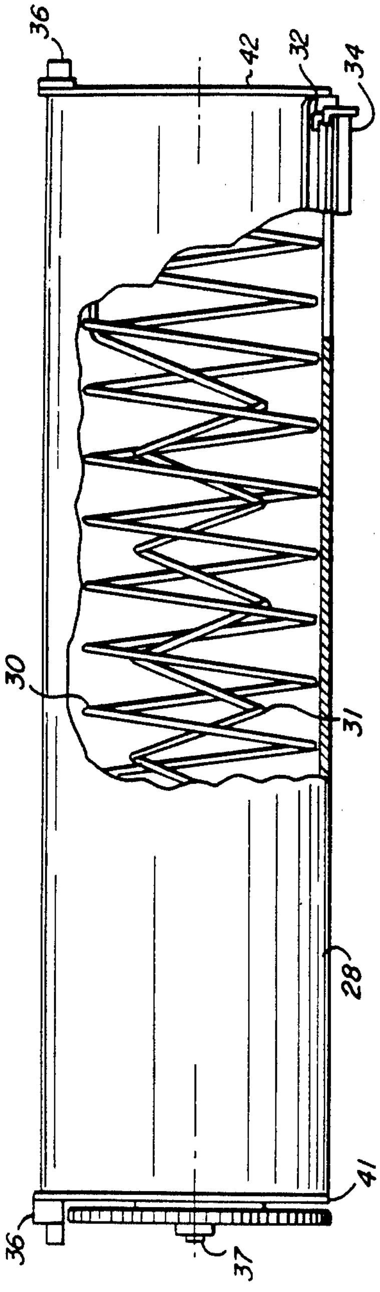
FIG. 3 is a side view partly cut away of the developer storage and dispensing cartridge illustrating the location of the counter rotating auger system according to the present invention.
Figure 4:
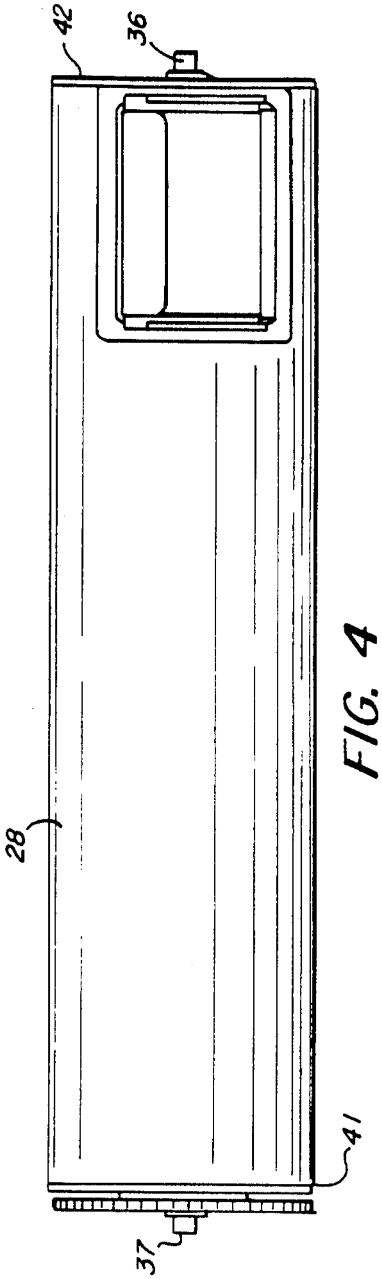
FIG. 4 is bottom view of the developer storage and dispensing cartridge illustrating the developer dispensing opening.

Referring now to FIG. 1, there is shown an automatic xerographic printing machine 10 including a developer assembly which has a removable developer storage and dispensing cartridge 20 according to the present invention. As used herein the term developer is intended to define all mixtures of toner and carrier as well as toner or carrier alone. The printer includes a photosensitive drum 12 which is rotated in the direction indicated by the arrow to pass sequentially through a series of xerographic processing stations; a charging station A, an imaging station B, a developer station C, a transfer station D and cleaning station E.

A document to be reproduced is placed on imaging platen 16 and scanned by moving optical system including a lamp 11 and mirrors 13 and 15 and stationary lens 18 to produce a flowing light image on the drum surface which had been charged at charing station A. The image is then developed at development station C to form a visible toner image. The development station C includes a developr roll 19 which may, for example, provide a magnetic brush of developer to the drum 12 which is supplied with developer from the removable developer storage and dispensing cartridge 20 according to the present invention by auger 21. The top sheet 23 in a supply of cut sheets is fed by feed roll 22 to registration rolls 25 in synchronous relationship with the image on the drum surface to the transfer station D. Following transfer of the toner image to the copy sheet, the copy sheet is stripped from the drum surface and directed to the fusing station F to fuse the toner image on the copy sheet after which the drum surface itself continues to cleaning station E where residual toner remaining on the drum surface is removed prior to the drum surface again being charged at charging station A. Upon leaving the fuser, the copy sheet with the fixed toner image thereon is transported to sheet collecting tray 26.

The practice of xerography is well known in the art and is the subject of numerous patents and texts including Electrophotography by Schaeffert and Xerography and Related Processes by Dessauer and Clark, both published in 1965 by Focal.

The developer storage and dispensing cartridge of the present invention will be described with further reference to FIGS. 2 through 6 and in particular FIGS. 3 through 6. Developer storage and dispensing cartridge 20 includes a generally cylindrical elongated container 28 enclosed at both ends by end plates 41 and 42. At the bottom of the cylindrical container is a dispensing opening 32 which is opened to dispense toner when inserted into the housing containing the cartridge by opening dispensing opening door 34. Locating pins 36 on each end of the cylindrical container locate the cartridge in the proper position in the developer housing C in the automatic printing machine. The movable cover 34 may, for example, be opened by positioning the developer container with the locating pins in the developer housing and as the developer container 28 is rotated forward into position, the movable cover 34 engages a stop member mounted on the developer housing thereby pushing the movable cover to the open position to prevent prevent dispensing. Developer is dispensed from the dispensing opening 32 from one end of the cartridge with the developer falling by gravity into auger assembly 21 which delivers the developer to the developer sump associated with the developer roll 19.

At one end of the developer storage and dispensing cartridge a gear 37 is provided which provides the driving engagement to the integral transport mixing and antibridging member to be hereinafter to be described by engagement with the drive mechanism (not illustrated) on the main machine. The gear 37 is connected to drive coupling member 39 on the interior of the cylindrical container 28 and adjacent to container end 41 (see FIG. 2). The drive coupling member has a slot therein for engagement with actuating arm 51 of the integral transport mixing and antibridging member. The integral developer transport mixing and antibridging member is rotatably supported and driven by drive coupling member 39 and is unsupported at the end of the cartridge where the developer dispensing opening is present. The integral developr transport mixing and antibridging member comprises first helically wound coiled spring auger element 30 which has a cross section substantially the same as the cross section of the container 28 and is freely rotatable therein extending across the container from end plates 41 to 42. This first coiled spring auger element is wound in a first direction such that when driven through gear 37, it tends to transport developer along its length toward the dispensing opening 32 as indicated by the arrow X.

Figure 5:
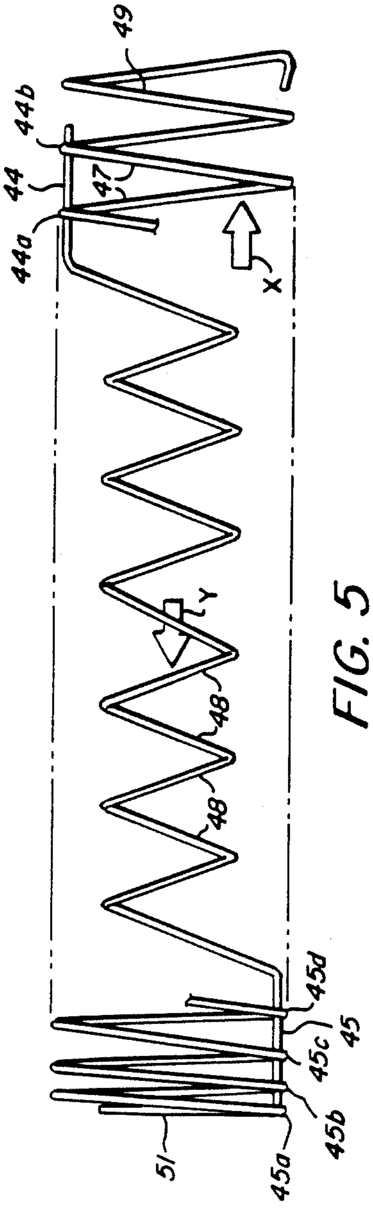
FIG. 5 is a sectional view of the counter rotating auger system illustrating the developer pumping action of the two spring augers.
Figure 6:
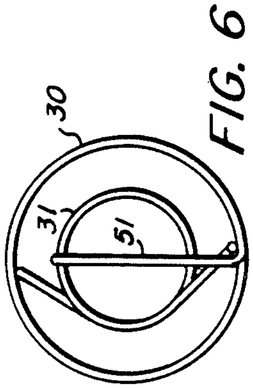
FIG. 6 is an end view of the integral developer transport and mixing member.

The integral developer transport mixing and antibridging member includes second helically would coiled spring element 31 which has cross section substantially smaller than the first coiled spring element 30 and which is positioned substantilly concentrically within the first outer coiled spring auger 30 and attached thereto. The second inner coiled spring auger has its coils would in the direction opposite to the direction of winding of the coils of the first spring auger 30 to provide a counter rotating motion relative to the first spring auger to tend to transport developer along its length away from the dispensing opening 32 and toward end plate 41 as indicated by the arrow Y. The second inner coiled spring auger 31 extends through central portion of the first outer coils spring auger 30 which extends the entire length of the container 28. At each end of the second inner coiled spring auger, longitudinal arms 44 and 45 are pvovided which are fastened as by welding to at least one of the coils of the first outer coiled spring auger at points 44A, 44B, 45A, 45B, 45C and 45D, respectively, to provide structural support to the first outer coiled spring auger 30 against compression. This structural rigidity at the drive end of the developer transport mixing and antibridging member may be further convenient to produce a required drive by spacing the first two to four coils of the outer coiled spring which are attached to the arm 45 at the drive end closer together than the remaining coils. While it is necessary that the longitudinal arms 44 and 45 be attached to at least one of the coils 47 of the outer coiled spring auger, it is preferred that both longitudinal arms 44 and 45 of the inner spring auger 31 be attached to at least two of the coils at each end of the first outer spring auger 30 to provide structural rigidity. It is also preferred, as illustrated in FIG. 5, that the longitudinal arms at each end of the second coiled spring element 31 be attached to opposite sides of the coils of the first spring element 30.

With a developer storage and dispensing cartridge fixed in place in the developer housing, the dispensing mechanism may be continuously actuated or intermittently actuated as the need arises. During operation, a substantially uniform dispensing rate of developer may be obtained with device performing the functions in the following way. The outer spring auger is wound in a first direction so that when it is appropriately rotated, it pumps developer toward the dispensing opening and during this operation, provides an antibridging function along its length by continuously cutting away the outer layer of developer in the cartridge. In addition, when the amount of developer within the toner cartridge has been substantially depleted, the outer spring auger, because of its cross sectional area being substantially the same as the cross sectional area of in the interior of the toner cartridge, effectively wipes or cleans the inside of the toner cartridge thereby minimizing any developer left in the bottle. Furthermore, as will be more readily appreciated from FIG. 5, with the outer spring auger being fixedly driven at one end, the free end or last coil 49, has some slight flexibility so that it can wind slightly in compression and then respond by rebounding to its original dimension, thereby shaking and loosening any compacted developer. The inner auger performs several functions in that again as illustrated in FIG. 5, it is fixedly attached to at least one coil at the end of the outer spring auger thereby providing a support for the outer spring auger to maintain its resistance against compression by toner compaction. As previously discussed, with a single spring auger driven about one end while it it tends to drive developer toward the dispensing end as the amount of developer increases at the dispensing end, it tends to collect and compact and provide a reactive force on the spring auger pushing the spring auger toward the drive end thereby removing the antibridging feature from about the dispensing opening resulting in bridging of developer and lack of flow of developer out of the bottle.

In additon, to providing the support for the outer spring auger, the inner spring auger transports developer at a less efficient rate away from the dispensing opening, thereby reducing the torque on the integral transport mixing and antibridging device. When the toner cartridge is nearly full the outer spring auger provides a larger transporting capacity and the inner spring auger tends to relieve any pressure buildup on the outer spring auger. Futhermore, the counter-rotational directional flow of developer material tends to further mix the developer material and in the case of developer containing both toner and carrier particles, ensure a more effective triboelectric charging relationship. Preferably, the inner spring auger extends only in the central portions of the outer spring auger, typically terminating adjacent the side of the dispensing opening nearest the drive end of the cartridge with the other end of the inner spring auger terminating before the end of the outer spring auger adjacent the drive end. This construction enables developer to be readily dispensed through the dispensing opening on the one end and at the other end minimizes the tendency of driving developer against the drive head tending to compact it thereby increasing the torque on the drive mechanism. With the disclosd construction whereby the longitudinal arm 45 is fastened to the first several coils of the outer spring auger, the drive end of the integral transport mixing and antibridging device is provided with a rigid drive of the outer and inner spring augers. The other end being unsupported and with at least the last coil of the outer spring auger unattached to the longitudinal support arm 44 of the inner spring auger there is some flexibility provided in the integral transport mixing and antibridging device which enables some vibration and as previously discussed a slight tendency toward compression of the last coil of the outer spring auger which tends to respond shaking loosening any compacted developer. It should be noted that a some point in time, the transport function of the inner spring auger ceases because the level of developer in the cartridge has been reduced to a point below the bottom of the coils of the inner spring auger. At this point in time, it has been found that the outer spring auger is sufficient to provide the necessary transport mixing and antibridging function.

In a typical construction the diameter of the inner spring auger is of the order of about 40 mm and the diameter of the outer spring auger is of the order of about 65 to 70 mm with the ratio of the inner spring diameter to outer diameter being in the range of 0.3 to 0.7 preferably 0.6 to permit the inner spring auguer to become ineffective when the last 15% to 50% of developer material remains in the cartridge. The inner sping auger has a pitch of about 25 mm, pitch being defined as the distance between adjacent coils in the spring, while the other spring pitch varies from 10 mm to 20 mm depending on the location along its length, the coils being more closely spaced at the drive end with the pitch increasing toward the unsupported end. The narrower pitch of the inner spring improves the ability to move developer to help offset its smaller diameter.

The patents and texts referred to herein, specifically in this application, are hereby incorporated herein by reference in their entirety into the present application.

Thus, according to the present invention, a simple low cost efficient developer storage and dispensing apparatus has been provided. While it has been described as effective for dispensing developer including both toner particles and carrier particles it will be understood that it is equally effective in dispensing other types of particulate material such as toner alone. Furthermore, while it has been described as being directed to a replaceable cartridge unit, it will be equally understood that it has equal utility when used as a fixed assembly in an automatic printing machine. Accordingly, it is intended to embrace all such alternatives and modifications as may fall within the spirit and scope of the appended claims.

I claim:

1. A developer storage and dispensing appartus comprising an elongated container enclosed at both ends having a substantially circular cross section capable of containing a given quantity of developer, said container having a dispensing opening adjacent one end and containing an integral developer transport mixing antibridging member rotatably supported at the opposite end of said container and unsupported at said one end comprising a first coiled spring element having a cross section substantially the same as the cross section of said container and freely rotatable therein said first coiled spring element being wound in a first direction to transport developer along its length toward said dispensing opening, said member including a second coiled spring element having a cross section substantially smaller than said first spring element and being substantially concentrically positioned within and attached to said first spring element, said second spring element being wound in a direction opposite to said first spring element to provide a counter rotating motion relative thereto to transport developer along its length away from said dispensing opening toward said opposite end, said second spring element extending through the central portion of said first spring element and having longitudinal arms at each end thereof attached to at least one of the coils at each end of said first spring element to provide support to said first spring element against compression.

2. The apparatus of claim 1 wherein each of said first and second springs elements are helically wound springs.

3. The apparatus of claim 1 wherein one end of said second spring element terminates adjacent the side of the dispensing opening nearest the opposite end of the container and the other end of said second spring element terminates before the end of said first spring element at said opposite end of said container.

4. The apparatus of claim 1 wherein said longitudinal arms at each end of said second coiled spring element are attached at least two coils at each end of said first spring element.

5. The apparatus of claim 4 wherein the longitudinal arms at each end of said second coiled spring element are attached to opposite sides of said first spring element.

6. The apparatus of claim 1 wherein at least the last coil of said unsupported end of said first spring element is unattached to a longitudinal arm of said second spring element.

7. The apparatus of claim 1 wherein said first coiled spring element extends substantially the entire length of said container.

8. The apparatus of claim 1 wherein said integral developer transport mixing and antibridging member is rotatably supported by a drive coupling member on said opposite end of said container in driving engagement with one end said first spring element.

9. The apparatus of claim 8 wherein said drive coupling member comprises an axial coupling on said opposite end of said container in engagement with an arm diametrically mounted to the first coil of said first spring element.

10. The apparatus of claim 1 wherein the ratio of the diameter of the inner spring element to the diameter of the outer spring element is of the order of 0.3 to 0.7.

11. The apparatus of claim 10 wherein the ratio is about 0.6.

12. The apparatus of claim 1 wherein the inner spring element has a pitch of about 25 mm and outer spring element has a pitch of from about 10 mm to about 20 mm with the coils being more closely spaced at the supported end of the pitch increasing toward the unsupported end.

* * * * *